United States Patent [19]
Heinecke

[11] Patent Number: 6,042,136
[45] Date of Patent: Mar. 28, 2000

[54] TRAILER HITCH GUIDE SYSTEM

[76] Inventor: Wayne S. Heinecke, 613 S. East St., New Athens, Ill. 62264

[21] Appl. No.: 09/102,108

[22] Filed: Jun. 22, 1998

[51] Int. Cl.$^7$ .................................................. B60D 13/00
[52] U.S. Cl. .......................................................... 280/477
[58] Field of Search .......................... 280/477; 116/28 R; 33/264, 286, 288, 293

[56] References Cited

U.S. PATENT DOCUMENTS 4,054,302  10/1977  Campbell .
5,927,229  7/1999  Karr .

*Primary Examiner*—Chris Schwartz
*Assistant Examiner*—C. T. Bartz

[57] ABSTRACT

A trailer hitch guide system comprising a trailer hitch having an inboard end coupled to a truck and having an outboard end with an upstanding ball. The trailer has a central extent for receiving a boat and an inboard end with an associated coupling component adapted to receive the ball and with an associated locking component. An attachment assembly interfacing between the ball and guide assists the driver of a truck in positioning the ball into position with respect to the guide. The assembly includes a rod with an upstanding vertical section and with a flag marker at the top thereof and a C-shaped section adjacent to the bottom thereof. A short vertical section at the bottom of the attachment assembly is coupled at its central extent to the bottom of the rod and has a contact plate therebeneath and an associated sphere thereabove. The sphere has a cylindrical aperture extending upwardly from the bottom of the sphere with a coil spring within the ball. A washer is coupled to the upper end of the vertical section and has a nut with exterior threads securing the washer and spring within the aperture.

4 Claims, 3 Drawing Sheets

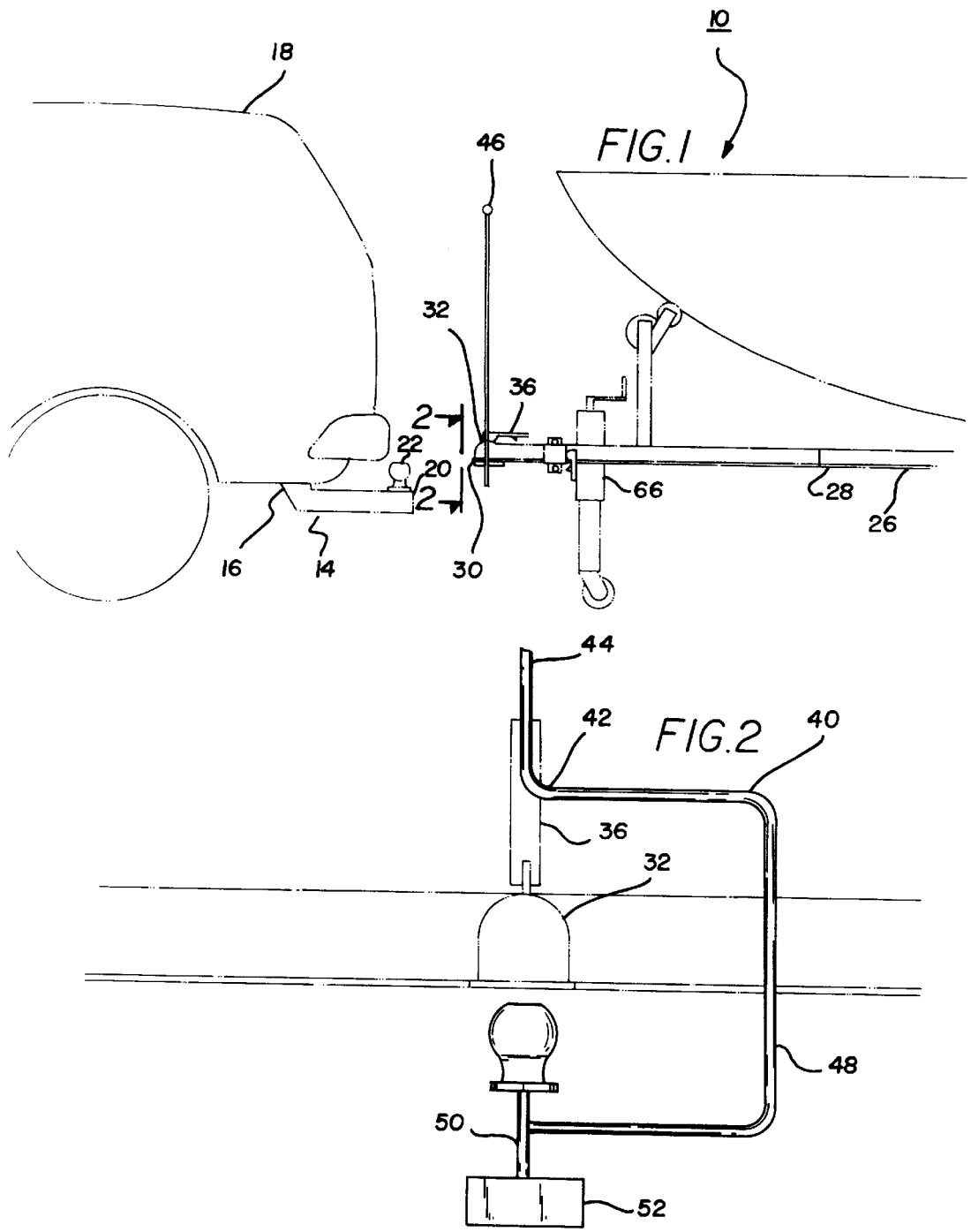

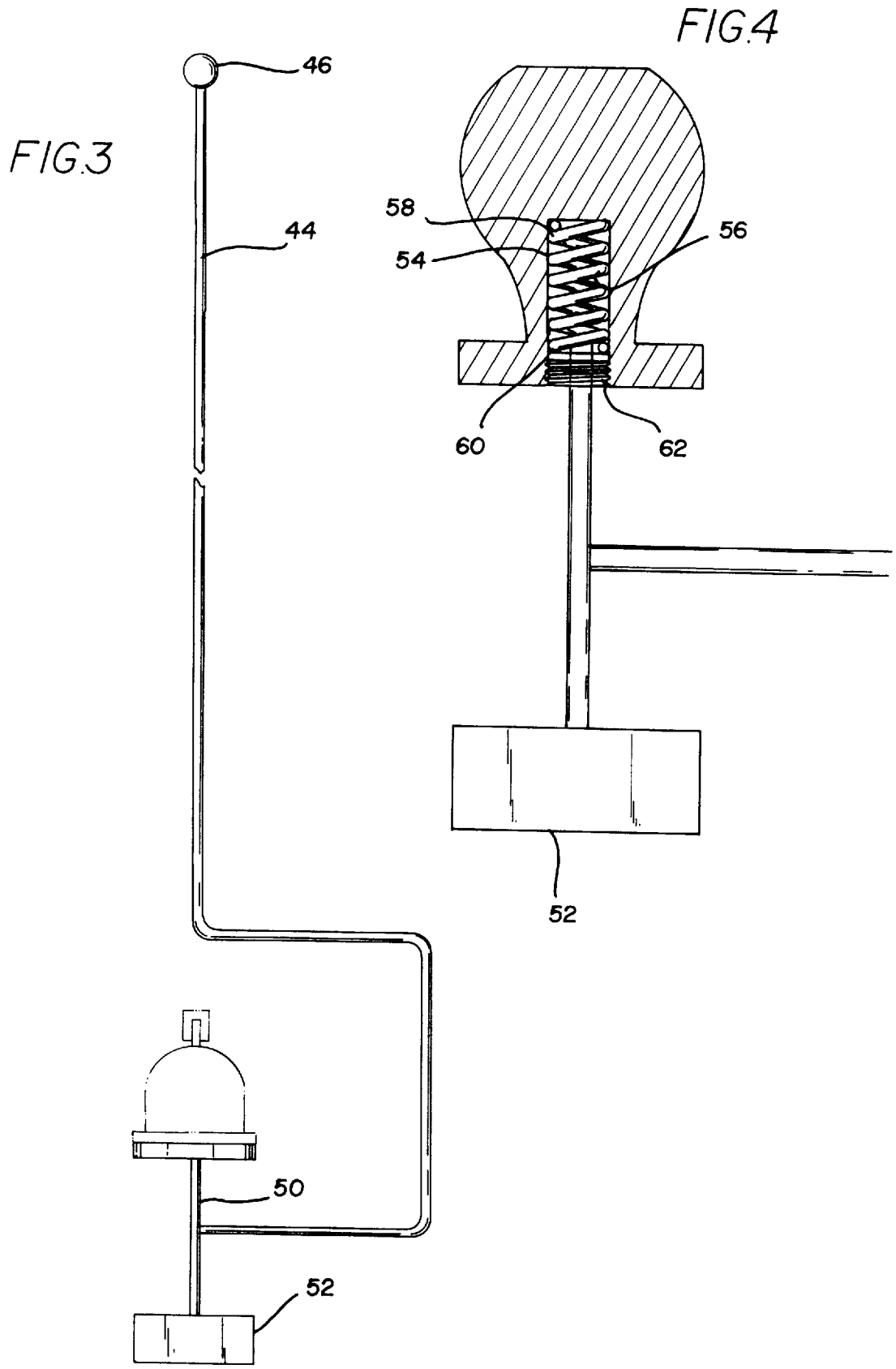

TRAILER HITCH GUIDE SYSTEM

BACKGROUND OF THE INVENTION

1. Field of the Invention

The present invention relates to a new and improved trailer hitch guide system and, more particularly, pertains to guiding a truck with a trailer hitch into position for receiving a receiver of a trailer.

2. Description of the Prior Art

The use of trailer hitch assemblies of known designs and configurations is known in the prior art. More specifically, trailer hitch assemblies of known designs and configurations heretofore devised and utilized for the purpose of coupling various related components through known methods and apparatuses are known to consist basically of familiar, expected, and obvious structural configurations, notwithstanding the myriad of designs encompassed by the crowded prior art which has been developed for the fulfillment of countless objectives and requirements.

The prior art discloses a large number of devices for guiding a truck with a trailer hitch into position for receiving a receiver of a trailer. By way of example, U.S. Pat. No. 4,313,264 to Miller, Sr; U.S. Pat. No. 4,666,176 to Sand; U.S. Pat. No. 4,723,788 to Suter; U.S. Pat. No. 5,035,441 to Murray; U.S. Pat. No. 5,269,554 to Law et al; and lastly, U.S. Pat. No. Des.270,906.

In this respect, the trailer hitch guide system according to the present invention substantially departs from the conventional concepts and designs of the prior art, and in doing so provides an apparatus primarily developed for the purpose of guiding a truck with a trailer hitch into position for receiving a receiver of a trailer.

Therefore, it can be appreciated that there exists a continuing need for a new and improved trailer hitch guide system which can be used for guiding a truck with a trailer hitch into position for receiving a receiver of a trailer. In this regard, the present invention substantially fulfills this need.

SUMMARY OF THE INVENTION

In view of the foregoing disadvantages inherent in the known types of trailer hitch assemblies of known designs and configurations now present in the prior art, the present invention provides an improved trailer hitch guide system. As such, the general purpose of the present invention, which will be described subsequently in greater detail, is to provide a new and improved trailer hitch guide system and methods which have all the advantages of the prior art and none of the disadvantages.

To attain this, the present invention essentially comprises a new and improved trailer hitch guide system comprising, in combination, a trailer hitch having an inboard end coupled to a truck and having an outboard end with an upstanding ball; a trailer having a central extent for receiving a boat and an inboard end with an associated coupling component adapted to receive the ball and with an associated locking component; an attachment assembly interfacing between the ball and guide to assist the driver of a truck in positioning the ball into position with respect to the guide, the assembly including a rod with an upstanding vertical section and with a flag marker at the top thereof and a C-shaped section adjacent to the bottom thereof, a short vertical section at the bottom of the attachment assembly coupled at its central extent to the bottom of the rod and having a contact plate therebeneath and an associated sphere thereabove, the sphere having a cylindrical aperture extending upwardly from the bottom of the sphere with a coil spring within the ball and a washer coupled to the upper end of the vertical section and with a nut with exterior threads securing the washer and spring within the aperture whereby movement of the contact plate caused by the ball contacting the contact plate will effect movement of the rod and flag to indicate proper positioning of the ball with respect to the guide; a jack coupled to the trailer adjacent to the hitch guide for raising and lowering the hitch guide for effecting coupling of the hitch guide to the ball; and an essentially spherically-shaped receiver for accepting the sphere of the attachment assembly coupled by a U-bolt and nuts to the trailer for receiving the sphere when not in use and with an associated locking component in association therewith.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved trailer hitch guide system which has all the advantages of the prior art trailer hitch assemblies of known designs and configurations and none of the disadvantages.

It is another object of the present invention to provide a new and improved trailer hitch guide system which may be easily and efficiently manufactured and marketed.

It is a further object of the present invention to provide a new and improved trailer hitch guide system which is of a durable and reliable construction.

An even further object of the present invention is to provide a new and improved trailer hitch guide system which is susceptible of a low cost of manufacture with regard to both materials and labor, and which accordingly is then susceptible of low prices of sale to the consuming public, thereby making such trailer hitch assemblies of known designs and configurations economically available to the buying public.

Still yet another object of the present invention is to provide a new and improved trailer hitch guide system which provides in the apparatuses and methods of the prior art some of the advantages thereof, while simultaneously overcoming some of the disadvantages normally associated therewith.

Even still another object of the present invention is to guide a truck with a trailer hitch into position for receiving a receiver of a trailer.

Lastly, it is an object of the present invention to provide a trailer hitch guide system. The trailer hitch guide system comprises a trailer hitch having an inboard end coupled to a truck and having an outboard end with an upstanding ball. The trailer has a central extent for receiving a boat and an inboard end with an associated coupling component adapted to receive the ball and with an associated locking component. An attachment assembly interfacing between the ball and guide assists the driver of a truck in positioning the ball into position with respect to the guide. The assembly includes a rod with an upstanding vertical section and with a flag marker at the top thereof and a C-shaped section adjacent to the bottom thereof. A short vertical section at the bottom of the attachment assembly as is coupled at its central extent to the bottom of the rod and has a contact plate therebeneath and an associated sphere thereabove. The sphere has a cylindrical aperture extending upwardly from the bottom of the sphere with a coil spring within the ball. A washer is coupled to the upper end of the vertical section and has a nut with exterior threads securing the washer and spring within the aperture.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side elevational view of the new and improved trailer hitch guide system constructed in accordance with the principles of the present invention.

FIG. 2 is a front elevational view taken along line 2—2 of FIG. 1.

FIG. 3 is an enlarged view of the rod, flag and related components shown in FIG. 2.

FIG. 4 is a cross-sectional view of the hitch guide and associated components shown in FIGS. 2 and 3.

The same reference numerals refer to the same parts throughout the various Figures.

DESCRIPTION OF THE PREFERRED EMBODIMENT

Figure 5:
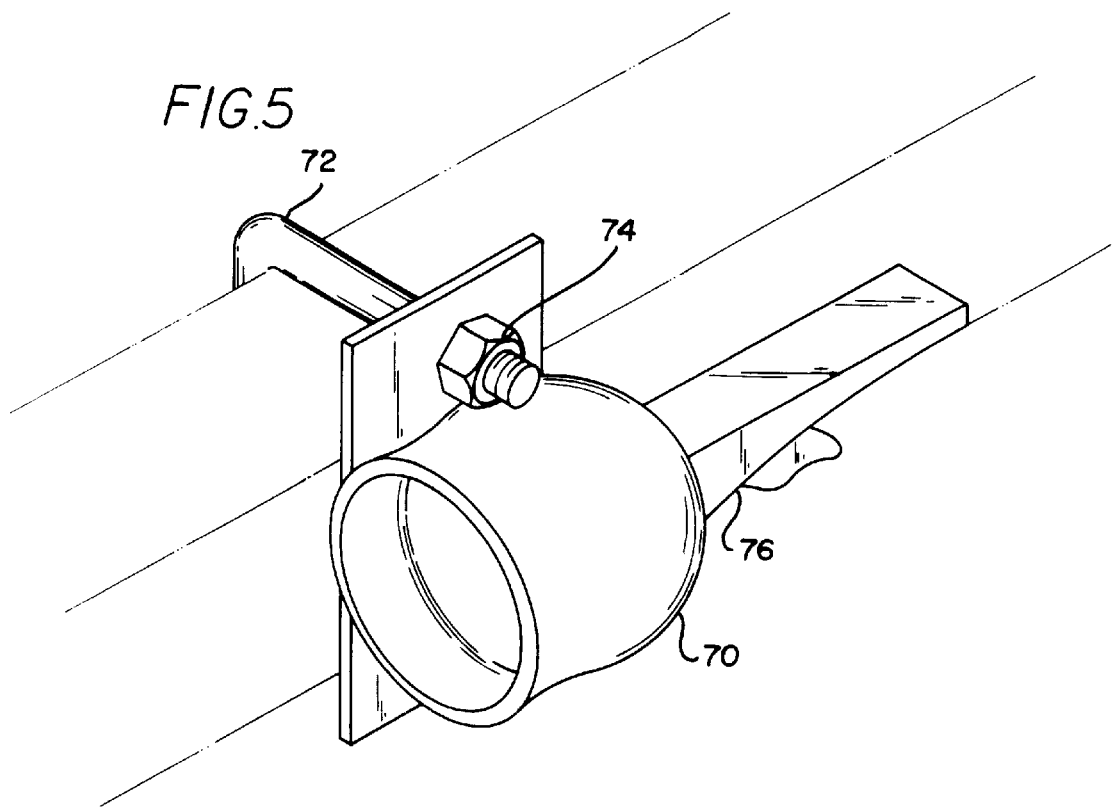
FIG. 5 is a perspective illustration of the hitch guide storage member shown in FIG. 1.
Figure 6:
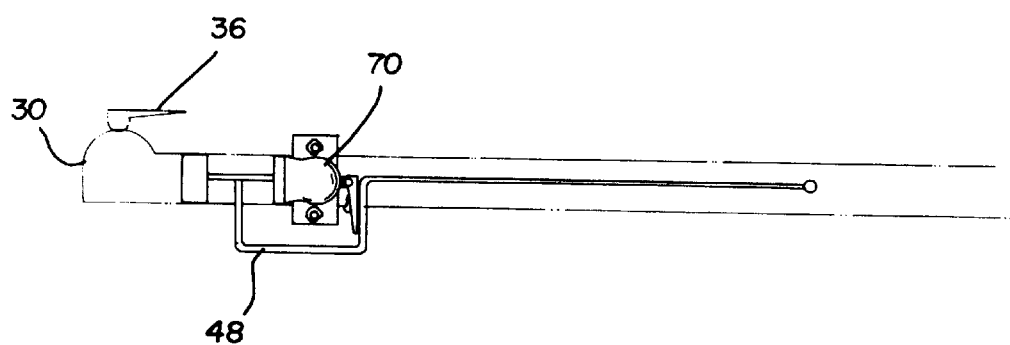
FIG. 6 is a side elevational view of the device shown in FIG. 5 when receiving the storage hitch guide assembly.

With reference now to the drawings, and in particular to FIG. 1 thereof, the preferred embodiment of the new and improved trailer hitch guide system embodying the principles and concepts of the present invention and generally designated by the reference numeral 10 will be described.

The present invention, the new and improved trailer hitch guide system, is a system 10 comprised of a plurality of components. In their broadest context, the components include a trailer hitch, a trailer, an attachment assembly, a jack, and a receiver. Each of the individual components is specifically configured and correlated one with respect to the other so as to attain the desired objectives.

More specifically, the system 10 of the present invention includes a trailer hitch 14. The trailer hitch has an inboard end 16 coupled to a truck 18. The trailer hitch also has an outboard end 20 with an upstanding ball 22.

Next provided is a trailer 26 having a central extent 28 for receiving a boat. The trailer also has an inboard end 30 with an associated coupling component 32 adapted to receive the ball 22 and with an associated locking component 36.

An attachment assembly 40 interfaces between the ball and guide to assist the driver of a truck in positioning the ball into position with respect to the guide. The assembly includes a rod 42 with an upstanding vertical section 44 and with a flag marker 46 at the top thereof. Further included is a C-shaped section 48 adjacent to the bottom thereof. A short vertical section 50 is located at the bottom of the attachment assembly coupled at its central extent to the bottom of the rod. This vertical section 50 has a contact plate 52 therebeneath and an associated sphere 54 thereabove. The sphere has a cylindrical aperture 56 extending upwardly from the bottom of the sphere. There is located a coil spring 58 within the ball and a washer 60 coupled to the upper end of the vertical section 50 and with a nut 62 with exterior threads securing the washer and spring within the aperture. Thusly, movement of the contact plate caused by the ball contacting the contact plate will effect movement of the rod and flag to indicate proper positioning of the ball with respect to the guide.

Next provided is a jack 66 coupled to the trailer adjacent to the hitch guide for raising and lowering the hitch guide for effecting coupling of the hitch guide to the ball.

Lastly provided is an essentially spherically-shaped receiver 70. The receiver 70 functions to accept the sphere of the attachment assembly coupled by a U-bolt 72 and nuts 74 to the trailer for receiving the sphere when not in use. There is also provided a an associated locking component 76 in association therewith.

The present invention has been designed to help line up a hitch and trailer tongue for towing campers, boat trailers, and car trailers. The ball of this device could be produced in any diameter, with two inches being the standard. The internal spring holds a flag in an upright position. The spring also pushes on a washer, which is welded to a tang. The flag is approximately 36 inches above the hitch and features a brightly-colored ball at the top. The base plate, which is part of the ball, holds it tight within the hitch. Nut and screw assemblies under the washer hold the entire unit together. The tang protrudes out from the bottom of the ball and base plate approximately 4 inches. It is also made of stainless steel.

When the ball of the vehicle hits the tang, the flag also moves. Thus, the driver of the vehicle knows when he/she is within one inch of being lined up properly with the hitch because the flag is visible from the rearview mirror. The driver raises the trailer tongue slightly, removes the device and lowers the hitch on the ball located on the vehicle.

The present invention is basically the very end of the trailer tongue with brackets attached, so that it ray be U-bolted to the side of the trailer tongue. This allows the unit to be stored right along side of the trailer tongue.

The present invention could also be produced with an electronic light at the top on the flag which would turn on when the tang is moved. It can be produced to be installed on existing hitches or incorporated in to the production of new hitches. The present invention could also be used as an anti-theft device that would lock into the tongue of the trailer, making it more difficult to steal.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved trailer hitch guide system comprising, in combination:

a trailer hitch having an inboard end adapted to be coupled to a truck and having an outboard end with an upstanding ball;

a trailer having a central extent for receiving a boat and an inboard end with an associated coupling component adapted to receive the ball and with an associated locking component;

a guide an attachment assembly interfacing between the ball and guide to assist the driver of a truck in positioning the ball into position with respect to the guide, the assembly including a rod with an upstanding vertical section and with a flag marker at the top thereof and a C-shaped section adjacent to the bottom thereof, a short vertical section at the bottom of the attachment assembly coupled at its central extent to the bottom of the rod and having a contact plate therebeneath and an associated sphere thereabove, the sphere having a cylindrical aperture extending upwardly from the bottom of the sphere with a coil spring within the sphere and a washer coupled to the upper end of the vertical section and with a nut with exterior threads securing the washer and spring within the aperture whereby movement of the contact plate caused by the ball contacting the contact plate will effect movement of the rod and flag to indicate proper positioning of the ball with respect to the guide;

a jack coupled to the trailer adjacent to the hitch guide for raising and lowering the attachment assembly for effecting coupling of the attachment assembly to the ball, and an essentially spherically-shaped receiver for accepting the sphere of the attachment assembly coupled by a U-bolt and nuts to the trailer for receiving the sphere when not in use and with an associated locking component in association therewith.

2. A trailer hitch guide system comprising:

a trailer hitch having an inboard end coupled to a truck and having an outboard end adapted to be with an upstanding ball;

a trailer having a central extent for receiving a boat and an inboard end with an associated coupling component adapted to receive the ball and with an associated locking component;

a guide an attachment assembly interfacing between the ball and guide to assist the driver of a truck in positioning the ball into position with respect to the guide, the assembly including a rod with an upstanding vertical section and with a flag marker at the top thereof and a C-shaped section adjacent to the bottom thereof, a short vertical section at the bottom of the attachment assembly coupled at its central extent to the bottom of the rod and having a contact plate therebeneath and an associated sphere thereabove, the sphere having a cylindrical aperture extending upwardly from the bottom of the sphere with a coil spring within the sphere and a washer coupled to the upper end of the vertical section and with a nut with exterior threads securing the washer and spring within the aperture.

3. The system as set forth in claim 2 and further comprising a jack coupled to the trailer adjacent to the attachment assembly for raising and lowering the attachment assembly for effecting coupling of the attachment assembly to the ball.

4. The system as set forth in claim 2 and further comprising an essentially spherically-shaped receiver for accepting the sphere of the attachment assembly coupled by a U-bolt and nuts to the trailer for receiving the sphere when not in use and with an associated locking component in association therewith.

* * * * *